United States Patent [19]

Johnson

[11] 3,922,328
[45] Nov. 25, 1975

[54] METHOD FOR MAKING STRUCTURAL FOAM PROFILES

[75] Inventor: Keith G. Johnson, Pittsburgh, Pa.

[73] Assignee: Arco Polymers, Inc., Philadelphia, Pa.

[22] Filed: Feb. 18, 1972

[21] Appl. No.: 227,575

[52] U.S. Cl. ............... 264/46.1; 264/48; 264/54; 264/171; 264/178 R; 264/210 R; 264/DIG. 5; 264/DIG. 14
[51] Int. Cl. .......................................... B79d 77/00
[58] Field of Search ............. 264/48, 51, 53, 128 R, 264/210 R, 321, 54, DIG. 14, 121, 47

[56] References Cited
UNITED STATES PATENTS

| | | | |
|---|---|---|---|
| 2,256,483 | 9/1941 | Johnston | 264/DIG. 14 |
| 2,451,986 | 10/1948 | Slaughter | 264/178 R |
| 2,537,977 | 1/1951 | Dulmage | 264/DIG. 14 |
| 2,624,913 | 1/1953 | Montross et al. | 264/178 R X |
| 2,893,877 | 7/1959 | Nickolls | 264/DIG. 14 |
| 2,905,972 | 9/1959 | Aykanian et al. | 264/53 |
| 2,922,194 | 1/1960 | Lampard et al. | 264/210 R X |
| 2,945,261 | 7/1960 | Aykanian et al. | 264/53 |
| 3,121,130 | 2/1964 | Wiley et al. | 264/53 |
| 3,190,943 | 6/1965 | Santelli | 264/53 X |
| 3,219,233 | 11/1965 | Harris et al. | 264/178 R X |
| 3,243,485 | 3/1966 | Griffin | 264/51 |
| 3,320,225 | 5/1967 | Bradbury | 264/210 R X |
| 3,324,217 | 6/1967 | Armstrong et al. | 264/210 R |
| 3,431,163 | 3/1969 | Gilbert | 264/53 X |
| 3,660,550 | 5/1972 | Sempel | 264/290 N X |
| 3,764,642 | 10/1973 | Boutillier | 264/54 X |
| 3,804,574 | 4/1974 | Gatto | 264/DIG. 14 |

FOREIGN PATENTS OR APPLICATIONS

| | | | |
|---|---|---|---|
| 1,257,051 | 12/1971 | United Kingdom | 264/51 |
| 2,063,589 | 6/1971 | France | 264/48 |

OTHER PUBLICATIONS

Whittington, Lloyd R. "Whittington's Dictionary of Plastics." Stamford, Conn., Technomic, c1968, pp. 18, 221, 251.

Billmeyer, Fred W. "Textbook of Polymer Science," New York, Interscience, c1962, pp. 164–166.

Primary Examiner—Philip E. Anderson
Attorney, Agent, or Firm—Synnestvedt & Lechner

[57] ABSTRACT

The technique uses an extruder for delivering a supply of softened thermoplastic resin material containing a foaming or expanding agent, the resin material being under pressure and therefore unexpanded in the extruder, but being delivered into a unconfined zone of lower pressure for partial expansion. The partially expanded resin material is drawn by a puller mechanism through a chilled shaping or sizing die of a cross sectional dimension smaller than that of the material in the unconfined zone. The material drawn into the sizing die continues its expansion in the interior of the profile with resultant development of porosity in the core of the profile while the surface layer is cooled and hardens as a substantially unexpanded structural shell.

12 Claims, 17 Drawing Figures

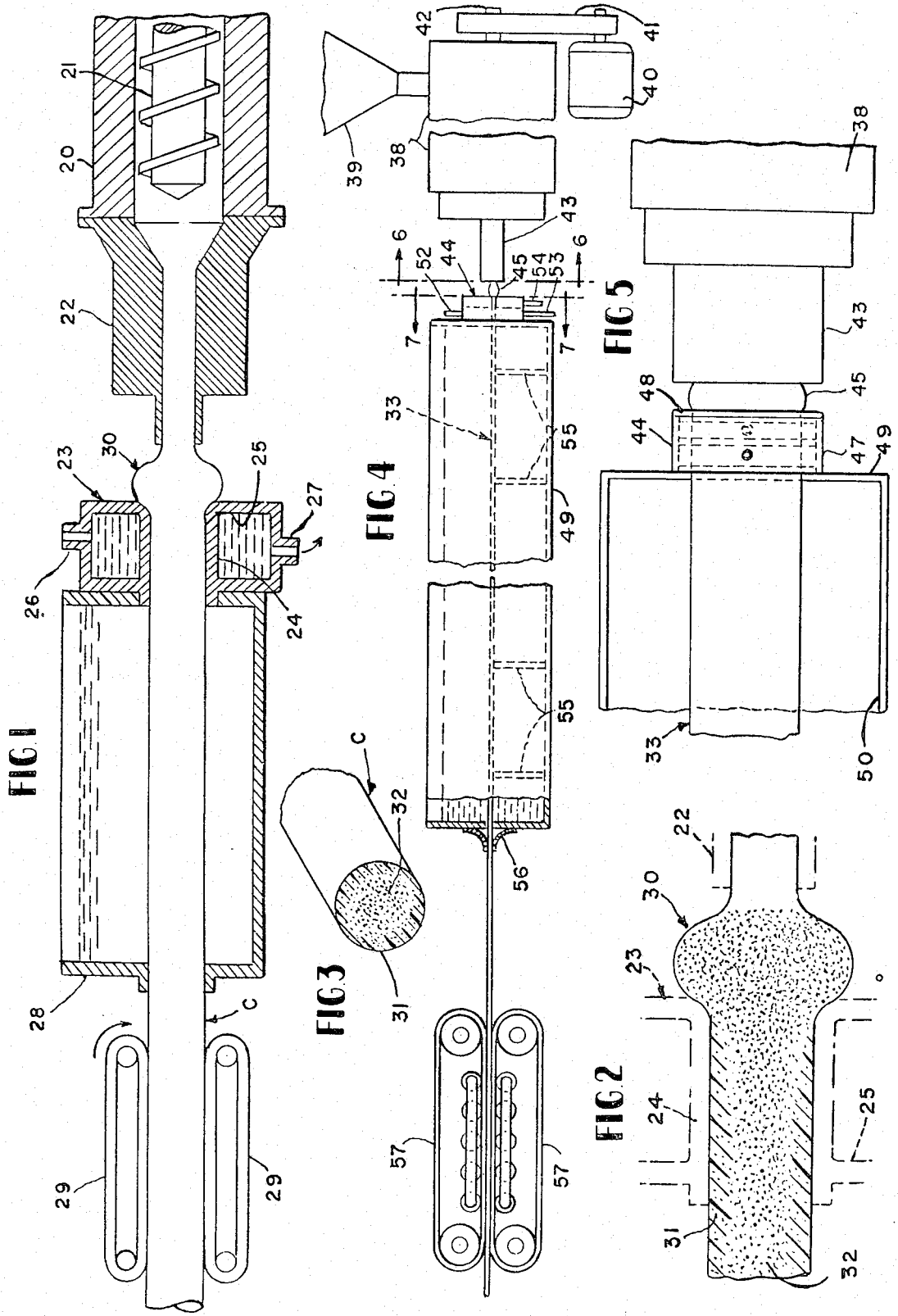

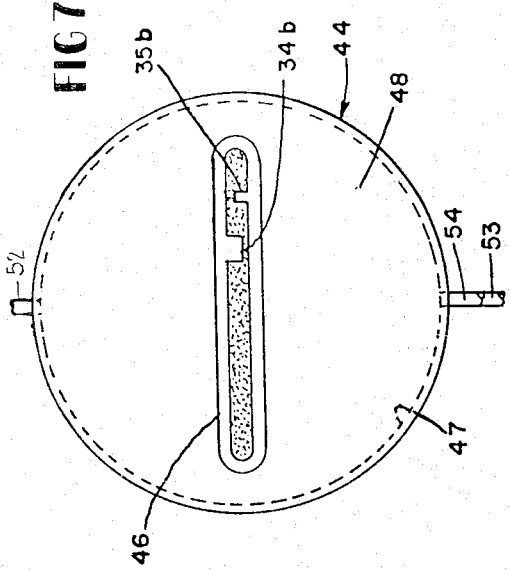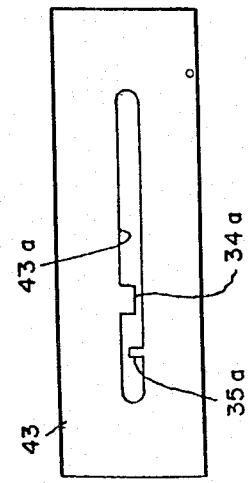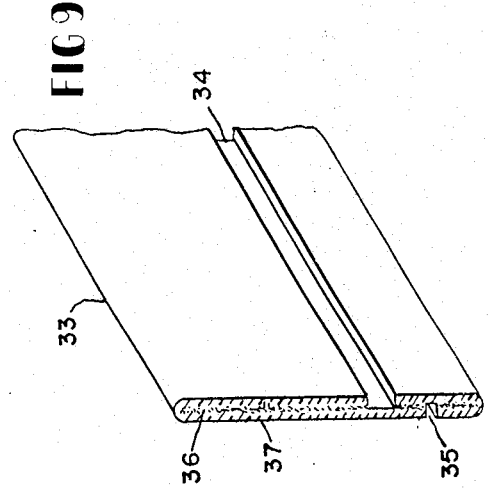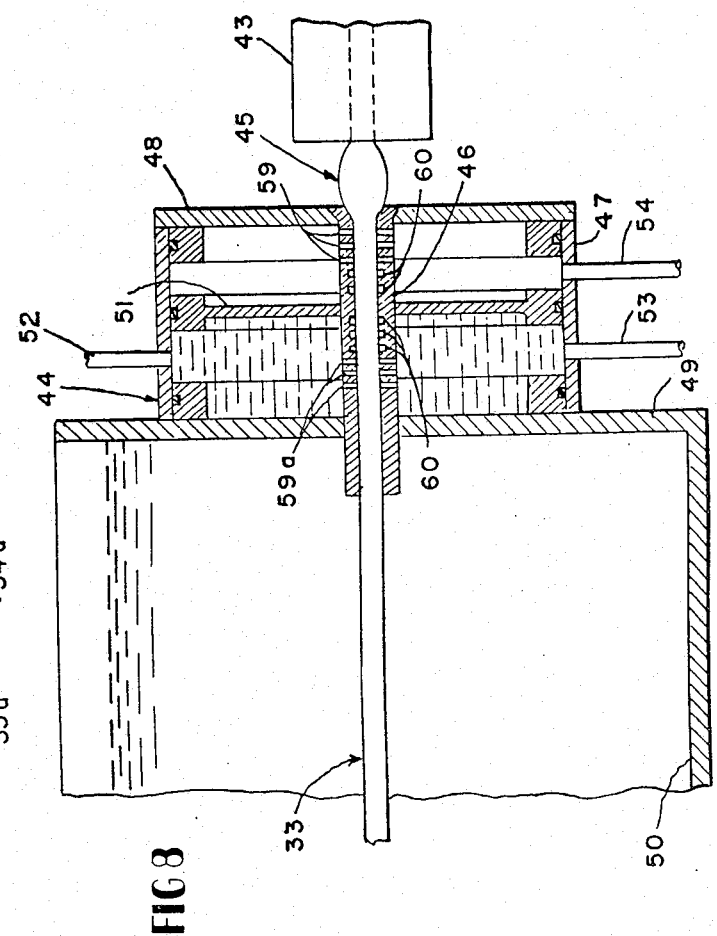

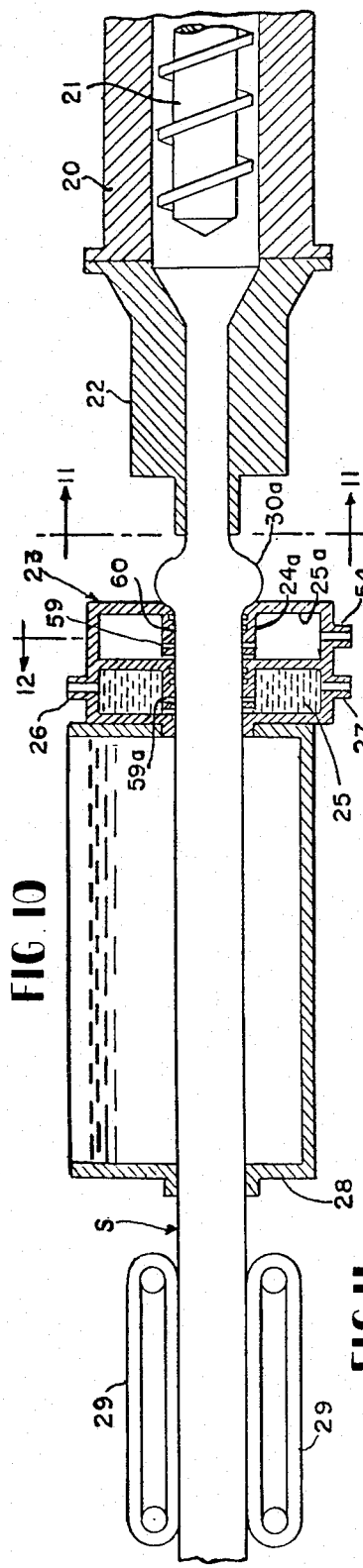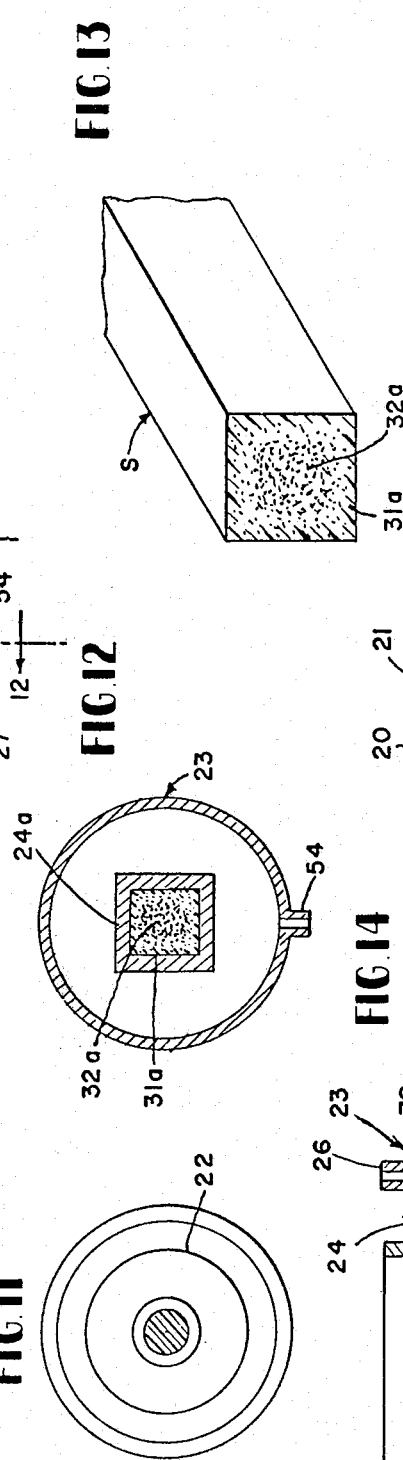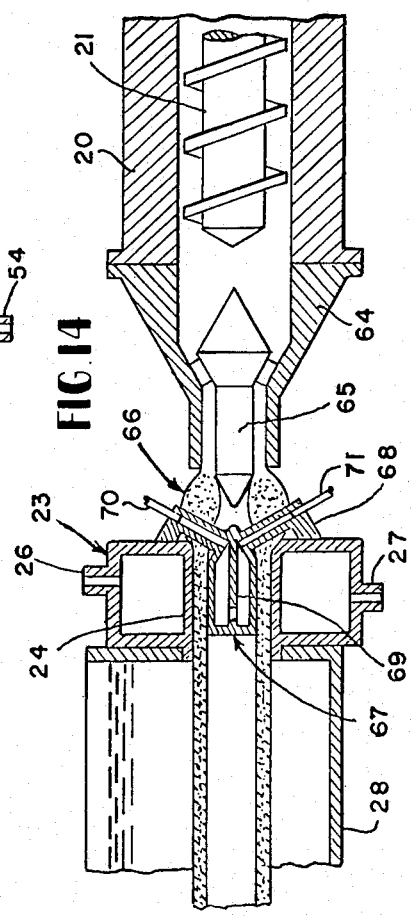

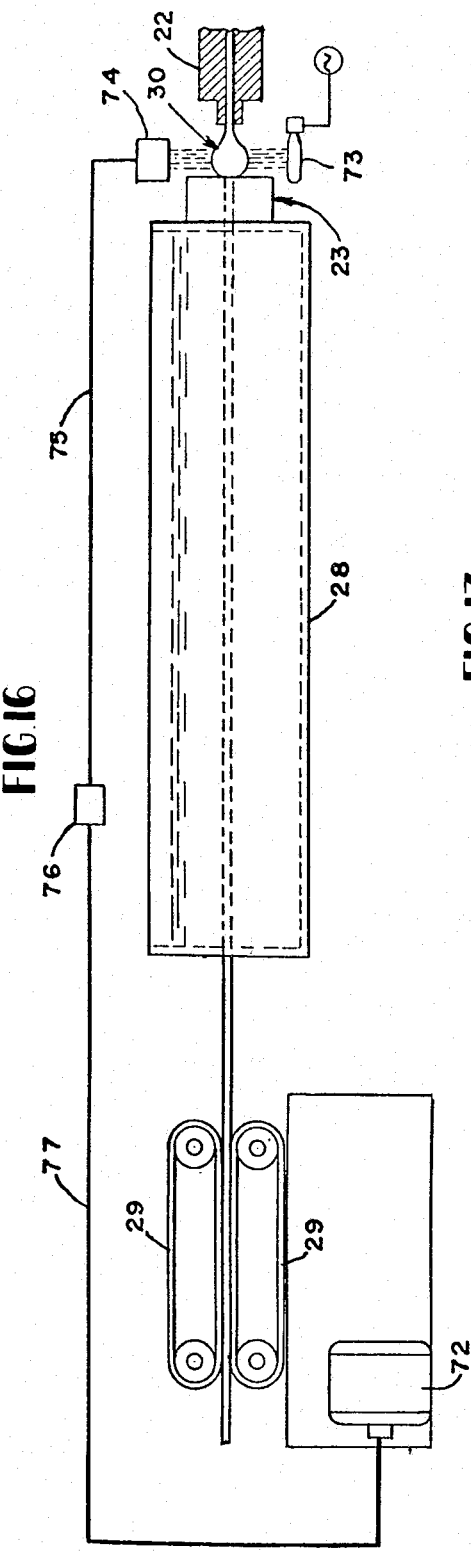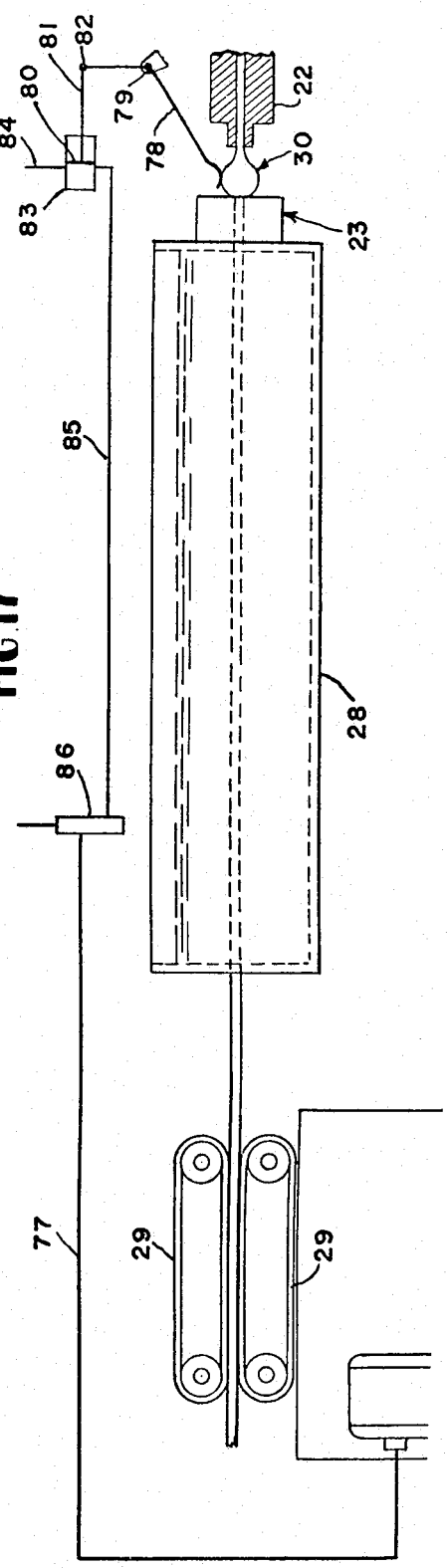

METHOD FOR MAKING STRUCTURAL FOAM PROFILES

This invention relates to a method for making structural foam profiles, particularly from thermoplastic resin materials such, for example, as polystyrene containing a foaming or expanding agent such as pentane.

BACKGROUND AND STATEMENT OF INVENTION AND OBJECTS THEREOF

Various techniques are already known for piece molding of various articles from foamable plastic or resin materials in which a batch of the foamable thermoplastic material is introduced into a mold for instance by injection of the softened thermoplastic material. The mold is cooled and after hardening of the resin the mold is opened and the piece removed. In this way articles are made having a substantially impervious or unexpanded sheath or shell, usually in the form of a relatively thin surface layer.

Certain techniques have also been known using an extruder for feed of material and an independently operating puller mechanism for take-offs, and providing for the continuous production of profiles. As with known piece-by-piece operations these operations produce profiles the surface layer of which is of relatively small thickness so that it does not contribute substantial structural strength to the profile.

In addition to inability to produce a skin or shell of substantial thickness and substantial structural strength, prior known techniques for continuously producing such profiles have also been subject to certain other disadvantages, for example, design of the forming die so that high frictional effects when passing material therethrough cause breakage of the profile, especially because of the independent and thus uncoordinated operation of the pulling mechanism and the extruder.

In addition the prior techniques have not been capable of selective control so that the extent of expansion of the core and the thickness of the unexpanded structural shell may be determined at will.

In addition certain prior techniques for continuously producing profiles having a porous core and an impervious surface have been sensitive to fluctuation of certain operating conditions, so that difficulty has been experienced in maintaining the continued operation of the system without encountering undesirable variations of the characteristics of the product produced. In some cases the sensitivity of the system has resulted in breakage of the piece being made with consequent shut down of the operation.

Efforts have also been made (see Kuhlmann French Pat. No. 1,498,620) to produce profiles having a porous core and a relatively thick and strong unexpanded skin by forcing the extrudate through a forming die by means of an extruder, but this technique is disadvantageous because the rate of production is very low.

It is a primary object of the present invention to provide a technique for producing foam profiles which are truly structural in character, the surface layer of the profile being of such thickness and density as to provide a high degree of structural strength. The invention moreover provides for the manufacture of such profiles at a high production rate.

It is a further object of the invention to provide for a technique for making such truly structural foam profiles under conditions which may be controlled to regulate important characteristic of the product such as extent of foaming of the core, thickness and density of the shell, and overall weight or composite density of the product measured, for example, in pounds per cubic foot (pcf).

It is a further object to provide a technique for producing structural foam profiles having good dimensional stability.

In considering another object of the invention it is first to be noted that, as is known, the operation of extruders may fluctuate somewhat as to temperature or pressure of the material supplied thereby. The invention provides a control system adapted to maintain uniformity of characteristics of the profile being made, notwithstanding fluctuations in the operation of the extruder.

Although the regulation or control system may be manually adjustable, the invention contemplates the provision of automatically operating means for regulating the production, for instance in accordance with the cross sectional size of the mass of expanding resin material in the unconfined zone lying between the diacharge orifice of the extruder and the entrance orifice of the sizing die.

Another object of the invention is to provide a technique for the production of some profiles which is not only accurately controllable, but which is reliable and capable of continued uninterrupted operation for long periods of time.

It is still further contemplated to produce structural foam profiles having many of a wide variety of cross sectional shapes, including not only simple shapes such as cylindrical rods and square or rectangular bars or boards, but also more complex shapes, for instance board-like pieces having angles or grooves therein. It is further contemplated according to the invention to provide for the production of profiles having a hollow interior, for instance pipes in which the profile is provided with a dense structural surface layer not only on the outside surface of the pipe but also on the inside surface, the core intervening between the outside and inside surface layers being porous or expanded.

Because the technique of the present invention is capable of controlling operation in various respects referred to above, it is also possible according to the present invention to produce structural foam profiles having characteristics so closely resembling those of wood that the profiles may readily be employed in substitution for wood pieces as in the case of boards, moldings, and the like. Such profiles according to the invention may readily be cut by hand or a power saw in the manner of wood pieces of similar size and shape. They may be drilled by means of hand or power drills in the manner of wood pieces. They may also be fastened to other pieces of the same kind or to wood by nailing or screwing, nailing operations being capable of use without any appreciable tendency to split or otherwise damage the piece.

According to the technique of the invention, it is also possible to produce such structural profiles which not only have the characteristics of wood but which even have graining effects at the surfaces simulating certain woods, which is of advantage in some situations where the pieces are to be used in combination with wood pieces. The grain effect can include surface pigmentation to resemble the multi-colored grain of various woods.

Still another characteristic of profiles made in accordance with the technique of the present invention is the fact that the surface texture of the profiles is such as to readily accept painting and other decorative surfacing materials in much the same manner and by the same techniques as are usable with wood.

Finally, the profiles made according to the present invention not only have various of the characteristics referred to above, but these profiles may readily be produced at a cost which is at least comparable with the cost of many woods and which in many cases is even less expensive than comparable woods. The scarcity of suitable dimensionally stable wood has caused increases in price, making the present profiles comparable in cost. In the case of wood profiles of more complex cross section, the cost of shaping and finishing the wood makes the present invention even more attractive from a cost standpoint.

How the foregoing objects and advantages are attained, together with others which will occur to those skilled in the art will appear more fully from the following description referring to the accompanying drawings, in which

BRIEF DESCRIPTION OF THE DRAWINGS

FIG. 1 is a somewhat diagrammatic sectional view through equipment arranged according to the present invention, including a screw type of extruder for pressurizing the softened expandable resin material, the cooled sizing die, a water bath receiving the profile from the die and a take off or puller mechanism engaging the piece downstream of the water bath;

FIG. 2 is an enlarged somewhat diagrammatic sectional view of a portion of the profile being made in the system of FIG. 1;

FIG. 3 is an isometric fragmentary view of a piece of the profile made in accordance with the system of FIGS. 1 and 2.

FIG. 4 is a side elevational view of a modified system according to the invention, including an extruder, sizing die, water bath and puller mechanism, the parts here being arranged to produce a board shaped profile;

FIG. 5 is a fragmentary plan view of certain parts of the equipment shown in FIG. 4, this view being on an enlarged scale as compared with FIG. 4;

FIG. 6 is an enlarged view of the delivery orifice of the extruder shown in FIG. 4, this view being taken as indicated by the section line 6—6 on FIG. 4;

FIG. 7 is an enlarged sectional view taken as indicated by the line 7—7 on FIG. 4 and showing the cross section of the profile as it enters the sizing die;

FIG. 8 is an enlarge vertical sectional view through the sizing die of the embodiment of FIGS. 4 to 7 and showing also certain parts associated with the sizing die;

FIG. 9 is a fragmentary isometric view of a piece of the profile made in accordance with the embodiment of FIGS. 4 to 8;

FIG. 10 is a view similar to FIG. 1 but illustrating a modification;

FIG. 11 is a sectional view taken as indicated by the line 11—11 on FIG. 10 and showing the circular cross section of the supply stream of resin material being delivered from the extruder;

FIG. 12 is a view taken as indicated by the line 12—12 on FIG. 10 and illustrating the square cross section of the sizing die employed in FIG. 10;

FIG. 13 is a fragmentary isometric view illustrating a piece of the square bar made in accordance with FIGS. 10 to 12;

FIG. 14 is a fragmentary view similar to certain portions of FIGS. 1 and 10 but illustrating a modification employed for the purpose of making a tubular profile by the technique of the present invention;

FIG. 15 is a fragmentary isometric view of a pipe made by the equipment of FIG. 14;

FIG. 16 is a somewhat diagrammatic view of equipment similar to that of FIG. 1, but illustrating the application of a control system for regulating the operation; and FIG. 17 is a diagrammatic view similar to FIG. 16 but illustrating a modified control system.

DETAILED DESCRIPTION WITH REFERENCE TO THE DRAWINGS

In the following description of the drawings it is assumed that the resin material used is a polystyrene resin containing pentane as a foaming agent. However, various resins and foaming or expanding agents may be employed, as is discussed more fully hereinafter in this specification.

Referring first to the embodiment shown in FIGS. 1, 2 and 3, a portion of an extruder of the screw type is illustrated toward the right in FIG. 1, the extruder barrel being indicated at 20 and the screw of the extruder being indicated at 21. This extruder is provided with a nozzle 22 having a discharge passage of circular cross section and preferably having long land lengths in the discharge nozzle to develop substantial resistance to the delivery of the resin material in order to provide appreciable back pressure and thus assure maintenance of the pressurized condition of the resin material until its actual delivery from the discharge orifice. The extruder is, of course, provided with the normal extruder heating means (not shown) so that the thermoplastic material delivered by the extruder is plasticated and softened. The resin material, however, is maintained under such pressure within the extruder that the material remains substantially unexpanded until delivery from the discharge orifice of the nozzle. In some cases where it is desirable to achieve the wood grain the heat at the extrusion die is increased, and this appears to effect some expansion of the resin material in the nozzle of the die. This accounts for the roughened surface of the resulting product due to the uneven flow of the extrudate in the extruder die, which is smoothed out again in the forming die as the surface layer is formed. To accentuate this effect, it is possible to add dry pigment at the hopper of the barrel of the extruder and this creates the differential coloring which accentuates the grain effect.

In a position spaced beyond the discharge orifice of the extruder nozzle, the arrangement of FIG. 1 provides a sizing or shaping die 23. This die has a central aperture defined by a cylindrical wall 24 having a rounded entrance opening. Surrounding the wall 24 the sizing die is jacketed to provide an annular chamber 25 for cooling water which may be circulated therethrough by means of the inlet and outlet connections indicated at 26 and 27. The discharge orifice of the sizing die communicates directly with a water bath provided in a tank 28, so that the profile being made is subjected to cooling by direct contact with water in the tank.

Downstream of the water tank is a puller mechanism comprising a pair of gripper belts 29, 29 adapted to be driven and thereby pull on the formed profile and advance it through the sizing die and water bath.

In considering the operation of the system shown in FIGS. 1 and 2, it is first pointed out that it is not necessary that the cross section of the extruder nozzle exactly conform either in size or shape with the size and shape of the profile to be made. The extruder nozzle delivers the softened expandable thermoplastic resin material into an unconfined zone lying between the discharge orifice of the extruder nozzle and the entrance opening of the sizing die. Because of the release of the pressure within the material at this point, the material partly expands and forms a mass or glob indicated at 30. The partially expanded condition of the material at this point is indicated diagrammatically by the stippling applied to FIG. 2. The action of the puller mechanism 29,29 is to draw the material from the mass 30 into the passage formed in the sizing die 23. The cross sectional size of the mass 30 is greater than the cross sectional size of the passage in the sizing die. As this material enters the sizing die the surface portions are immediately chilled because of the cooling water circulated in the passage 25 surrounding the cylindrical wall 24 in consequence of which the surface portions solidify. The internal pressure of the extrudate as it enters the forming die is also increased, which assists in forming the impervious solid and structural skin. This solidification is indicated by FIG. 2 by the cross hatched area 31. This area increases in thickness progressively from the entrance end of the sizing orifice or passage toward the discharge end thereof.

The rate of operation of the puller mechanism 29,29 is adjusted so that the material in the unconfined mass 30 intervening between the extruder nozzle and the entrance to the sizing die is only partially expanded and in view of this the resin material in the core portion of the profile continues its expansion as it is being pulled into and through the sizing die. The combined action of the puller mechanism as just described and the "shock" chilling of the surface of the profile in the sizing die results in the formation of a surface layer which is not only solidified but which is substantially unexpanded while at the same time providing an expanded or porous core within the profile. The operating conditions just referred to and particularly because of the internal pressure developed by the continued expansion of the material in the core of the profile, result in maintenance of the external surface of the profile in contact with the surface of the die passage.

The operating conditions above described also result in solidifying the surface portion of the profile to a sufficient depth so that its tensile strength is sufficient to withstand the pulling action of the puller mechanism, which is necessary to provide for the advancement of the profile being formed through and out of the sizing die and through the water bath in the tank 28. The water bath also serves to further cool the formed profile throughout at least most of the cross section of the profile so that by the time the profile is gripped by the opposed traveling belts 29,29, the pressure applied by those belts will not distort or collapse the article being made.

Although specially refrigerated cooling liquids may be utilized in the sizing die 23 and in the tank 28, water at normal supply temperatures will ordinarily suffice.

In FIG. 3 there is illustrated a fragment of the cylindrical rod "C" made in accordance with FIGS. 1 and 2 and in FIG. 3 the dense outer skin is indicated at 31 and the porous core is shown by stippling at 32.

In the embodiment shown in FIGS. 4 to 9, the equipment is arranged to produce a profile in the shape of a board, for instance a board 33 is shown in FIG. 9. This board may, for example, have a width of about 6 inches and a thickness of about three-eighths inch. The board shown in FIG. 9 is provided with two grooves 34 and 35, although it will be understood that board type pieces of a wide variety of configurations may be produced according to the invention. The specific shape illustrated in FIG. 9 is well adapted for use as a side wall of a drawer, the groove 35 serving to receive the edges of the bottom or floor (not shown) of the drawer, and the groove 34 being arranged to cooperate with a guide rail (not shown) on which the drawer is arranged to be movably mounted in the piece of furniture in which the drawer is incorporated.

The side wall or drawer piece shown in FIG. 9 has a central porous core 36 and also a dense skin or surface layer 37, the density of the skin and the porosity of the core providing various of the characteristics of wood above referred to, so that in assembling the drawer the bottom wall received in the groove 35 may readily be secured therein either by adhesive means or by nailing or any other system normally usable with all wood construction. Thus, nails may be driven directly through the board itself into the edge of the floor piece received in the groove 35.

In making a board such as shown in FIG. 9, the equipment may include an extruder having a barrel 38 into which particulate resin material containing the foaming agent is introduced, for instance from the feeding means 39. A suitable power drive such as the motor 40 operating through belt 41 may serve to drive the shaft 42 of the extruder screw. In this case the extruder is provided with a nozzle structure 43 having a discharge orifice 43a shaped generally to the contours of the piece being made, i.e., the board shown in FIG. 9 with grooves 34 and 35 therein. The projections 34a and 35a shown in FIG. 6 will serve to define the grooves in the material being extruded.

It should here be noted that it is not necessary that the orifice of the extruder nozzle exactly conform with either the size or shape of the profile being made.

As in the embodiment of FIGS. 1 and 2 the arrangement of FIGS. 4 to 8 also includes a sizing die, generally indicated at 44, this die having its entrance opening spaced from the discharge opening of the extruder nozzle 43, in view of which a mass of expanding resin material indicated at 45 develops in the unconfined space between the extruder nozzle and the sizing die. This mass is, of course, much wider than it is thick as will be seen from comparison of various of the figures, the width and thickness of this mass being somewhat greater than the width and thickness of the profile being made. Thus the mass 45 is of greater cross sectional dimension than the passage in the sizing die, which is desirable in order to maintain a reservoir or body of expandable resin material to be drawn into the passage of the sizing die by the action of the puller mechanism.

As best seen in FIGS. 7 and 8 the sizing die 44 includes a die tube wall 46 defining the sizing passage itself, this wall having a projection 34b corresponding to the groove 34 in the piece being made and also having a projection 35b corresponding to the groove 35 in the piece being made. The tubular wall structure 46 is surrounded by a cylindrical jacket 47 and an end wall 48 joins the cylindrical wall 47 with the die tube 46 in order to enclose the space surrounding the die tube 46. The opposite end of the cylindrical wall 47 is closed by engagement with the wall 49 of the tank 50 containing the water bath into which the profile is delivered from the sizing die. The interior volume of the chamber defined by the wall 47 is divided by a transverse partition 51, the space to the left of the partition 51 being employed for circulation of cooling water for the sizing die by means of inlet connection 52 and outlet connection 53.

The space within the cylindrical wall 47 to the right of the partition 51 (as viewed in FIG. 8) is employed as a vacuum chamber, this space being provided with a vacuum connection 54 for purposes to be explained.

After leaving the discharge end of the passage in the sizing die, the profile 33 travels through the water bath, being supported therein at intervals by means of the supports 55 (see FIG. 4). After traveling through the water bath the product leaves through an aperture at the left end as viewed in FIG. 4, which aperture is provided with rubber or other resilient sealing means indicated at 56, and the profile is then engaged by the belts 57,57 of the puller mechanism.

In considering the operation of the system disclosed in FIGS. 4 to 8, reference is first made to the illustration of the die tube 46 as seen in FIG. 8. As is shown, in the region of the vacuum chamber (to the right of partition 51 as viewed in FIG. 8) the die wall is provided with ports 59 through which water may flow from the surface of the profile into the vacuum chamber to be carried away through the vacuum connection 54 under the influence of a vacuum pump or the like (not shown). Some water may enter the die tube from the water bath in the tank 50. Indeed, the vacuum may draw water inwardly from the water bath in the tank 50 and also from the water cooling chamber through parts 59a along the surface of the profile, thereby effecting some lubrication as well as direct cooling of the profile as it passes through the sizing die. The vacuum also prevents water from leaking along the surface of the profile and out of the entrance end of the die.

The water lubrication just referred to is of importance in a system of the kind herein described in which foaming or expansion of the resin material is actually taking place in the interior of the profile at the time it is being drawn through the sizing die, thereby tending to expand the profile against the walls of the sizing die. As a further aid to minimizing surface friction in the sizing die, the interior surfaces of the die are also advantageously provided with transverse slots such as indicated at 60, these being shown both in the entrance region of the die tube and also in the region of the water cooling chamber.

The action of the embodiment of FIGS. 4 to 8 is similar to that described above with reference to FIGS. 1 and 2 with respect to the partial expansion of the resin material in the mass 45 developed in the unconfined zone between the extruder and the sizing die. In addition as in FIGS. 1 and 2, foaming of the resin continues within the sizing die. As in FIGS. 1 and 2, the embodiment of FIGS. 4 to 8 also contemplates the maintenance of a partially expanded mass 45 of somewhat larger cross section than the cross section of the sizing passage.

By the system of FIGS. 4 to 8 specially shaped profiles such as shown in FIG. 9 can readily be produced, notwithstanding the fact that a relatively small cross sectional dimension may be present in the profile at various points, or even throughout the entire width thereof.

The embodiment of FIGS. 10 to 12 provides for the production of a square bar S, such as shown in FIG. 13 having a dense skin layer 31a and a porous core 32a. This embodiment of the equipment is very similar to that shown in FIGS. 1 and 2, and similar reference characters have been employed for similar parts. In this case the extruder may be identical with that employed in FIG. 1, having a cylindrical passage in the delivery nozzle 22 as appears in FIG. 11. However, as best seen in FIG. 12 the wall structure 24a defining the sizing die passage is arranged to provide a passage of square cross section in order to form the square bar S shown in FIG. 13. It will thus be seen that in this embodiment although the resin material delivered into the unconfined mass 30a is of circular cross section, the piece being made is of square cross section.

As in the preceding embodiments, the speed of operation of the puller mechanism is adjusted so that a partially expanded mass 30a is maintained at a cross sectional dimension larger than the cross section of the sizing die passage and thus of the square bar being produced.

FIG. 10 illustrates a sizing die structure having a water circulation chamber 25, as in FIG. 1, but further having a vacuum chamber 25a, with vacuum connection 54, as in FIG. 8. The die tube 24a in this embodiment is also provided with transverse grooves 60 as in FIG. 8, and still further with ports 59 and 59a extended through the die tube not only in the region of the vacuum chamber but also in the region of the water circulating chamber 25. The ports 59a in the region of the water chamber provide for flow of water to the surface of the profile in the die and this is of advantage as a further means of lubricating the profile in its passage through the die. Water entering the die tube through the ports 59a from the water chamber 25 will be withdrawn into the vacuum chamber, but this water further aids in lubricating the profile.

Still another embodiment is illustrated in FIG. 14, this embodiment being adapted to the production of a cylindrical piece such as the pipe P shown in FIG. 15. The wall of this pipe is provided with both external and internal layers 61 and 62 formed of dense resin material without appreciable expansion or foaming while the interior or core of the wall 63 is porous or expanded.

In FIG. 14 an extruder 20 having a screw 21 as in FIGS. 1 and 10, is employed but here the nozzle structure 64 is provided with a core or torpedo 65 cooperating with the nozzle to provide an annular discharge passage from which the resin material is delivered into the annular partially expanded mass 66.

FIG. 14 also shows a sizing die 23 having a die tube 24 defining a cylindrical sizing passage which delivers the formed profile into the water bath contained in the tank 28, these parts being essentially the same as those described above with reference to FIG. 1. Here, however, a core or torpedo is also mounted within the sizing die. This torpedo is indicated at 67, being supported in any suitable manner as by circumferentially spaced legs 68 fastened to the front face of the sizing die 23, or, if desired, by mounting means connected with the torpedo 65 in the nozzle of the extruder. The torpedo is desirably of hollow construction and is provided with a partition 69 forming inlet and outlet chambers for cooling water circulated through the torpedo from the inlet connection 70 to the outlet connection 71.

By effecting a shock cooling of the internal as well as the external surface of the tubular profile being made, the tube or pipe is provided with both internal and external dense surface layers, while retaining a porous core within the wall of the pipe being formed.

As in the other embodiments, the cross section of the annular passage in the sizing die is smaller than the cross section of the annular mass 66 of the partially expanded mass of the resin material developed in the unconfined zone between the extruder and the sizing die.

In all of the systems described above the mass of partially expanded resin material in the unconfined zone between the extruder and the sizing die serves as an accumulator or reservoir from which the material to be sized is drawn by the action of the puller mechanism. In view of this the speed of operation of the puller mechanism, in relation to the speed of operation of the extruder influences the size or volume of the mass of partially expanded resin material. If the puller mechanism tends to draw down the size of the unconfined mass to a point approximating the cross section of the sizing passage, the piece may become defective or the operation may break down. On the other hand, if the puller mechanism does not draw the partially expanded resin out of the unconfined mass at least at the rate at which the mass is forming, then the mass will increase in size also undesirably influence the operation, for instance because the rate of feed of the material through the mass will diminish and feed at an excessively decreased rate may result in excessive cooling and hardening of the mass so that it will no longer feed properly into and through the sizing die. Excessive slow down in the rate of feed through the mass between the extruder and the sizing die will also result in more foaming and expansion before the material enters the sizing die.

Variations in the size of the unconfined mass may also occur as a result of fluctuations in the operation of the extruder. While a system as described above may be regulated by adjusting the speed or operation of the extruder, it is preferred to regulate the system by adjusting the speed of the puller mechanism. Indeed, the operation of extruders does not always remain constant, even with given speed setting, and these fluctuations can readily be compensated by adjustment of the speed of operation of the puller mechanism.

Moreover, while such regulation may be effected by manual adjustment in accordance with visually observed conditions of the operation, such as the size of the unconfined mass, it is contemplated according to the invention to employ an automatic control system, one embodiment of which is illustrated in FIG. 16. The system there shown is similar to that shown and described above with reference to FIGS. 1 and 2, including the use of an extruder having a nozzle 22, a sizing die 23, a tank 28 for a water bath and puller belts 29,29 which are here shown as adapted to be driven by the variable speed motor 72.

The unconfined mass of partially expanded resin material is indicated at 30 in FIG. 16, and in the control system here shown a source of light 73 is provided at one side of the mass 30 and a photoelectric cell 74 is provided at the other side. The photoelectric cell is connected as indicated at 75 with the motor speed controller at 76 which in turn is connected as indicated at 77 with the motor 72. With this type of system fluctuations in the size of the unconfined mass 30 may be employed to adjust the motor speed controller and it is contemplated that the motor speed and thus the speed of the puller mechanism be increased when the unconfined mass 30 increases in size and thus diminishes the light received by the photo cell 74 from the light source 73. Similarly if the size of the mass 30 decreases, the photo cell 74 will actuate the speed controller to reduce the motor speed and thus the speed of the puller mechanism.

Certain other control arrangements may be utilized as alternatives to the arrangement of FIG. 16. For example, the arrangement shown in FIG. 17 may be used. In this arrangement, instead of detecting changes in the size of the mass of resin material in the unconfined zone by means of a photoelectric cell, provision is made for the use of a mechanical feeler to detect variations in the size of the resin mass.

The embodiment illustrated in FIG. 17 is shown only diagrammatically as the details of the control parts are not part of the invention. The feeler is indicated at 78, this feeler being pivotally mounted at 79 at a fixed point, the feeler being connected with a piston valve structure indicated at 80 by means of the link 81 which is pivoted as indicated at 82 to an arm rigid with and movable with the feeler 78. The valve mechanism 80 works in a cylinder or housing 83 with which a fluid pressure supply line 84 is connected. The fluid pressure delivery line 85 is connected with the motor control device 86 comprising a fluid pressure responsive device for regulating the operating currect delivered to the motor through the connection diagrammatically indicated at 77. The remainder of the system illustrated in FIG. 17 is similar to that shown in FIG. 16 and therefore need not be described in detail herein.

The details of construction of the control system of FIG. 17 form no part of the present invention per se. However, it is to be understood that when the mass of resin material 30 tends to increase in size, the feeler 78 will be displaced in a manner to alter the fluid pressure supplied to the control device 86 in a sense causing the motor 72 of the puller mechanism 29 to increase in speed, thereby increasing the speed of feed of the profile being made and thus compensating for the increase in size of the unconfined resin mass 78. When the resin mass decreases in size, the control action decreases the feed speed, as will be understood.

In connection with the over-all system provided according to the present invention, it is to be noted that in consequence of various of the operating conditions preferably established, it is possible to produce a typical profile at a much higher rate than is practicable with prior known techniques, for instance, the technique disclosed in French Pat. No. 1,498,620. Indeed, in the manufacture of a rod of about 1¼ inches in diameter, having a porous core and a dense surface layer, and weighing from about 31 to 37 pounds per cubic foot, it is possible to operate at a speed above about 5 feet per minute in the practice of the present invention, which compares with an operating speed of about 1 foot per minute as referred to in the above identified French Patent.

Resins for use in the practice of this invention can be any expandable or foamable plastic materials which can be rendered flowable. It is believed that the present invention will have its widest use in fabricating foamed products from expandable thermoplastic resins which are rendered soft and flowable under the influence of heat. It should be understood that such resins must have a sufficiently high melt strength to withstand the force which is applied as the resin is pulled through the sizing die during formation of the porous core and the dense surface layer. Any of the resins generally used in foamed molding processes and having such melt strength can be used in the practice of this invention.

For any particular application, the resin should be selected on the basis of the properties desired in the final product. Examples of thermoplastic resins that can be used are: homopolymers and copolymers of vinyl aromatic compounds such as polystyrene, polyvinyl toluene, homopolymers of alpha-methylstyrene and 2,5 dichlorostyrene, acrylonitrile-butadiene-styrene copolymers and styrene-butadiene copolymers; polyamides such as polyhexamethylenedipamide (nylon 6/6), polycaprolactam (nylon 6) and polyamides prepared by reacting hexamethylene diamine with sebacic acid; polymers prepared from the monoolefins such as polyethylene, polypropylene, polybutylene and polyisobutylene; vinyl polymers such as polyvinyl chloride, polyvinyl acetate and polyvinylidene chloride; polyacrylics such as polyacrylic acid, polymethyl methacrylate, acrylonitrile-butadiene copolymers; vinyl ethers such as polyvinyl methyl ether; cellulose esters such as cellulose acetate, cellulose butyrate and cellulose propionate, or mixtures thereof.

The resin is foamed by the use of an expanding agent which will produce voids or bubbles in the resin as the pressure on the resin is reduced when the resin exits from the extruder into the free space provided before the material reaches the sizing die, and foaming or expanding continues in the interior of the profile while the external shell is solidified in the sizing die. Expanding agents which will effect such expansion include many which have heretofore been used in various other techniques for making expanded resin articles. Exemplary classes of expanding agents that can be used are: normally gaseous materials; normally liquid materials which volatize readily; and normally solid materials which upon reaction or decomposition, usually effected by heating, evolve a gas as one of the decomposition or reaction products. The expanding agent and the amount used for any particular application will be governed generally by the specific resin that is being foamed and molded and by the extent and type of foaming that is desired in the product.

Examples of normally gaseous materials which can be combined with the foamable resin under pressure and which are capable of foaming the resin as the pressure is reduced include nitrogen, carbon dioxide, lower molecular weight paraffins such as propane and butane, methylchloride, lower molecular weight olefins such as ethylene, propylene, and butylene or mixtures of the above. Gaseous materials of this type can be injected directly into the resin material in the extruder used.

Examples of normally liquid materials which under the influence of heat volatalize at temperatures near those at which the resin is rendered soft and flowable include: liquid fluorocarbons such as 1,2-dichlorotetrafluoroethane; methylchloride; paraffins such as pentane and hexane, and other relatively low boiling hydrocarbons, or mixtures thereof. Upon heating a mixture of the expandable resin and normally liquid blowing agent, the liquid volatalizes and the resulting gas effects foaming of the resin as pressure on the resin is reduced. Such liquid blowing agents can be combined with the resin according to available techniques. For example, resin particles can be coated or impregnated with the liquid blowing agent or the liquid blowing agent can be incorporated into the polymerization reaction mixture from which the resin is produced thereby providing resin particles having integrated therein the blowing agent.

Examples of normally solid materials which decompose to evolve a gas include azodicarbonamide, 1,1'-azobisformamide, dinitroisopentamethylenetetramine, barium azodicarbonate and ammonium and potassium bicarbonate. Materials which react to liberate a gas include, for example, the combination of an alkali or alkaline earth carbonate or bicarbonate, for example, sodium bicarbonate, and an organic acid such as citric acid; a reaction product of these materials is carbon dioxide gas which effects expansion of the resin. Such normally solid materials which evolve a gaseous expanding agent can be dry blended readily with particles or beads of the resin.

The amount of expanding agent that can be incorporated in the expandable resin can vary over a wide range, for example, from about 1 to about 15 wt. percent. As mentioned above, the amount of expanding agent used will be determined generally by the specific expanding agent used, the specific resin being foamed and the extent and type of foaming that is desired in the product.

For preparing foamed articles such as boards, rods or other profiles or structural shapes, it is preferred to use polymers of sytrene including homopolymers of styrene, copolymers of styrene and modified polystyrene resins.

Some examples of preferred expandable polymers of styrene for use in the practice of this invention are as follows. One type of preferred expanding sytrene resin (described in U.S. Pat. No. 2,983,692) is prepared by adding to the aqueous suspension polymerization reaction mixture from which the resin is made a normally liquid blowing agent such as a petroleum ether, certain ligroines, pentane and hexane. The reaction product comprises polymeric particles or beads which have intertgrated therewith the blowing agent. The blowing agent selected for use with any particular resin should be volatile and boil somewhat below the incipient softening point of the resin. Such blowing agents can have a boiling point within the range of about 30° to about 100°C., preferably about 35° to about 65°C., and can be added to the reaction mixture in amounts of from about 5 to about 30 parts per 100 parts of the expandable resinous particles or beads produced. Upon heating the resinous particles to their incipient softening point or higher, the blowing agent volatizes and the discrete polymeric particles melt and flow together in the form of a cellular polymeric structure. Examples of expandable styrene polymers that can be prepared in this manner include: polystyrene, a homopolymer of dimethylstyrene, styrene-butadiene copolymer, a copolymer of styrene and alpha-methyl styrene, a terpolymer of styrene, butadiene and alpha-methyl sytrene, a copolymer of styrene and isobutylene, a copolymer of styrene and dimethyl styrene, and impact polystyrene which is an admixture of polystyrene with an elastomer such as, for example, a styrene-butadiene copolymer.

Another preferred expandable styrene resin that can be used in the practice of this invention comprises polystyrene particles or beads having integrated therewith a normally liquid blowing agent and a carbon dioxide liberating agent, for example a mixture of an alkali or alkaline earth carbonate or bicarbonate and an organic acid. The normally liquid blowing agent, having a boiling point of about 30° to about 90°C., can be incorporated in the polystyrene by adding it to the aqueous suspension polymerization reaction mixture from which the polystyrene is prepared in amounts of about 4.5 to about 9 percent. The carbon dioxide liberating agent can thereafter be admixed with the resulting polystyrene particles or beads in amounts sufficient to produce upon reaction a total of about 0.1 to about 5 wt. percent, based on the expandable beads, of water and carbon dioxide. The organic acid should have at least about 3.0 milli-equivalents of acidic hydrogen per gram. Examples of acids which can be used are citric acid, diglycollic acid, tartaric acid and succinic acid. Expandable polystyrene resins of this type can be used to produce foamed or cellular articles having relatively smaller and more uniformly sized voids or cells. Such expandable resins are described in U.S. Pat. No. 2,941,964.

The same type of expandable resin as described immediately above can be prepared by an alternative method, as described in U.S. Pat. No. Re. 26,278. A mixture of two types of polystyrene particles, one type comprising the polystyrene having the organic acid incorporated therein and the other comprising the polystyrene with the carbonate or bicarbonate incorporated therein. A normally liquid blowing agent can be incorporated into one or both types of the resin particles.

Another type of expandable resin (described in U.S. Pat. No. 3,457,205) that can be used in practice of this invention is one which comprises expandable polystyrene beads, a non-expandable thermoplastic resin powder and a hydrate containing at least 25 percent by weight of chemically bound water, such as, for example, hydrates of cupric sulfate, ferrous sulfate and sodium carbonate. This type of composition, upon being extruded and advanced through the sizing die produces an article, the skin or outer layer of which is comprised of the non-expandable thermoplastic resin. In this manner, foamed articles with a relatively integral protective coating can be produced. This type of resin can comprise expandable polystyrene beads, about 0.33 to about 3 parts by weight of the non-expandable thermoplastic resin powder and about 3 to 40 percent by weight of the hydrate. Examples of the non-expandable thermoplastic resin that can be used include polyethylene, ethylene-vinyl acetate copolymer, polystyrene, polyvinyl chloride, polyamides and polyacrylates.

A highly preferred resin for preparing foamed structural profiles comprises the following:

A. about 10 to about 30 wt. percent of expandable polystyrene beads containing about 4 to about 8 wt. percent pentane, about 0.1 to about 0.5 wt. percent of citric acid and up to about 0.4 wt. percent of sodium carbonate; and B. about 70 to about 90 wt. percent of impact polystyrene comprising a graft polymer of styrene on polybutadiene or a blend of polystyrene and polybutadiene wherein the polybutadiene content of the graft polymer can comprise 1.5 to about 7.5 wt. percent and the polybutadiene content of the blend can comprise about 3 to about 12 wt. percent.

Such resins can be used to produce foam products having a density within the range of about 20 to about 60 pounds per cubic foot, depending on the temperature of the extrudate, the cooling applied and the speed of the take-off mechanism which affects the amount of time that the extrudate has to expand.

Some modifications can be made to the above foamable composition to achieve certain desired properties in the foamed profile. For example, the impact polystyrene can be replaced by low density or high density polyethylene or by an acrylonitrilebutadiene-styrene resin or by a general purpose polystyrene. Also the expandable polystyrene resin of the above-described composition or the aforementioned modified compositions can be replaced with about 1 to about 10 wt. percent of a normally solid blowing agent which decomposes to evolve a gas. Examples of such agents include p,p′ oxybis (benzenesulfonyl hydrazide), azo-bis-butyronitrile, azodicarbonamide and carbonate esters used in combination with an activator to promote the release of gas, for example, sodium carbonate and succinyl mono glycerin carbonate.

Other materials or additives generally incorporated into expandable resinous compositions can be included in the foamable resinous compositions which are expanded and foamed according to the method of the present invention. Examples of such additives include heat and light stabilizers, antioxidants and lubricants. Coloring agents such as pigments and dyes can be added also to the expandable resinous composition for the purpose of producing colored and decorative articles. Conventional amounts of such additives and agents can be used.

Fillers can be added also to the foamable resinous compositions. Examples of fillers include calcium carbonate, fibrous reinforcements such as glass fibers, cellulose and asbestos fibers. The fillers can be used in conventional amounts, according to the desired characteristics of the finished product.

I claim:

1. A method for making continuous lengths of resin profiles from thermoplastic resin material containing a heat sensitive foaming or expanding agent, comprising delivering the resin material under pressure through and out of a confining passage into an unconfined zone of lower pressure, the temperature and pressure of the resin material in the confining passage providing a softened but unexpanded condition of the resin material therein and the pressure of the resin material in the unconfined zone providing for partial expansion of the resin material by the action of the foaming agent, delivering the expanded resin material from the unconfined zone into a shaping die passage having cross sectional dimensions the same as those of the profile being made and in which said cross sectional dimensions are uniform throughout a substantial length of the die passage, solidifying the surface layer of the previously softened and now expanded resin material while it is in the shaping die passage by cooling the surface layer of the resin material in the shaping die passage to a temperature below the softening point, and applying axial tension to the extruded material in the die passage by gripping the resultant shaped profile downstream of the die passage and pulling on the profile to advance the resin material from said unconfined zone into and through the die passage in sliding surface contact with the die passage, the rate of delivery of the resin material out of the confining passage into the unconfined zone being sufficient to maintain a mass of partially expanded resin material in said zone which mass is of larger cross sectional area than the die passage, and the rate of pulling of the resin material from the unconfined zone into the die passage being sufficient to advance the resin material into the die passage before the resin material is fully expanded and thereby provide for solidifying of the surface layer while in contact with the surface of the shaping die passage under radial pressure developed by foaming of the foaming agent in the interior portion of the material and thus effect formation of a profile having the cross sectional dimensions of the die passage and having a dense skin and expanded core.

2. A method as defined in claim 1 in which the die shaped profile is subjected to cooling downstream of the shaping die passage but upstream of the gripping to provide substantial interior hardening of the shaped profile before being gripped.

3. A method as defined in claim 2 in which the cooling downstream of the shaping passage is effected by delivering the shaped profile into a cooling water bath.

4. A method as defined in claim 1 and further including lubricating the interface between the solidifying profile and the surface of the shaping die.

5. A method as defined in claim 4 in which the lubrication is effected by introducing water at said interface.

6. A method for making continuous lengths of resin profiles from softened thermoplastic resin material containing a foaming or expanding agent, comprising delivering the resin material under pressure through and out of a confining passage into an unconfined zone of lower pressure, the temperature and pressure of the resin material in the confining passage providing a softened but unexpanded condition of the resin material therein and the pressure of the resin material in the unconfined zone providing for expansion of the resin material, delivering the expanded resin material from the unconfined zone into a shaping die passage having cross sectional dimensions the same as those of the profile being made and in which said cross sectional dimensions are uniform throughout a substantial length of the die passage, the die passage having its delivery end submerged in a water bath, solidifying the surface layer of the previously softened and now expanded resin material while it is in the shaping die passage by cooling the surface layer of the resin material in the entrance end portion of the die passage to a temperature below the softening point, and applying axial tension to the expanded material in the die passage by gripping the resultant shaped profile downstream of the water bath and pulling on the profile to advance the resin material from said unconfined zone into the die passage.

7. A method as defined in claim 6 and further including subjecting the entrance end portion of the die passage to vacuum and thereby effect flow of water from the water bath into the shaping die passage along the surface of the profile.

8. A method for making continuous lengths of resin profiles from softened thermoplastic resin material containing a foaming or expanding agent, comprising delivering the resin material under pressure through and out of a confining passage into an unconfined zone of lower pressure, the temperature and pressure of the resin material in the confining passage providing a softened but unexpanded condition of the resin material therein and the pressure of the resin material in the unconfined zone providing for expansion of the resin material to develop an enlarged mass of the resin material, delivering the unexpanded resin material from the unconfined zone into a shaping die passage, solidifying the surface layer of the previously softened and now expanded resin material while it is in the shaping die passage by cooling the surface layer of the resin material in the die passage to a temperature below the softening point and thereby provide a die shaped profile having a dense skin and expanded core, applying axial tension to the expanded material in the die passage by gripping the resultant shaped profile downstream of the die and pulling on the profile to advance the resin material from said unconfined zone into the die passage, and regulating the rate of advancement of the resin material from said unconfined zone into the die passage in accordance with the size of the mass of resin material in the unconfined zone, the control providing for maintenance of a mass of cross sectional larger than the cross section of the die passage.

9. A method for making continuous lengths of resin profiles from softened thermoplastic resin material containing a foaming or expanding agent, comprising delivering the resin material under pressure through and out of an annular confining passage into an unconfined zone of lower pressure, the temperature and pressure of the resin material in the confining passage providing a softened but unexpanded condition of the resin material therein and the pressure of the resin material in the unconfined zone providing for expansion of the resin material, delivering the expanded resin material from the unconfined zone into an annular shaping die passage, solidifying the inside and outside surface layers of the previously softened and now expanded resin material while it is in the die passage by cooling the inside and outside surface layers of the resin material in the die passage to a temperature below the softening point and thereby provide a die shaped tubular profile having an expanded core with a dense skin at the inside and outside surfaces, and applying axial tension to the expanded material in the die passage by gripping the resultant shaped profile downstream of the die and pulling on the profile to advance the resin material from said unconfined zone into the die passage.

10. A method as defined in claim 9 in which the rate of advancement of the resin material from the unconfined zone into the shaping passage is sufficiently high to ensure only partial expansion of the resin material in the unconfined zone and to ensure substantial expansion in the shaping passage.

11. A method for making continuous lengths of resin profiles from thermoplastic resin material containing a foaming or expanding agent, comprising heating the resin material sufficiently to soften the resin material to flowable condition, delivering the softened resin material under pressure through and out of a confining passage into an unconfined zone of lower pressure, the temperature and pressure of the resin material in the confining passage maintaining a softened but unexpanded condition of the resin material therein and the pressure of the resin material in the unconfined zone providing for partial expansion of the resin material under action of the foaming agent, delivering the partially expanded resin material from the unconfined zone into a shaping die passage having cross sectional dimensions the same as those of the profile being made and in which said cross sectional dimensions are uniform throughout a substantial length of the die passage, delivering the profile from the shaping die passage through a water bath, solidifying the surface layer of the previously softened resin material while it is in the shaping die passage by cooling the surface layer of the resin material in the entrance end portion of the die passage to a temperature below the softening point, applying axial tension to the expanded material in the die passage by gripping the resultant shaped profile downstream of the water bath and pulling on the profile to advance the resin material from said unconfined zone into the die passage, and effecting flow of water along the surface of the profile in the die passage in a direction upstream of advancement of the profile, while the profile is being advanced through the die passage.

12. A method for making continuous lengths of resin profiles from thermoplastic resin material containing a foaming or expanding agent, comprising heating the resin material sufficiently to soften the resin material to flowable condition, delivering the softened resin material under pressure through and out of a confining passage into an unconfined zone of lower pressure, the temperature and pressure of the resin material in the confining passage maintaining a softened but unexpanded condition of the resin material therein and the pressure of the resin material in the unconfined zone providing for partial expansion of the resin material under action of the foaming agent, delivering the partially expanded resin material from the unconfined zone into a shaping die passage having cross sectional dimensions the same as those of the profile being made and in which said cross sectional dimensions are uniform throughout a substantial length of the die passage, solidifying the surface layer of the previously softened resin material while it is in the shaping die passage by cooling the surface layer of the resin material in the entrance end portion of the die passage to a temperature below the softening point, applying axial tension to the expanded material in the die passage by gripping the resultant shaped profile downstream of the shaping die passage and pulling on the profile to advance the resin material from said unconfined zone into and through the die passage, and regulating the pulling and thus the rate of advancement of the profile in accordance with the cross sectional area of the mass of resin material in the unconfined zone, the regulation providing for maintenance of a mass of cross sectional area greater than that of the shaping die passage.

* * * * *